(12) United States Patent
Barrenscheen

(10) Patent No.: US 7,899,071 B2
(45) Date of Patent: Mar. 1, 2011

(54) SERIAL BUS STRUCTURE

(75) Inventor: Jens Barrenscheen, Munich (DE)

(73) Assignee: Infineon Technologies Austria AG, Villach (AT)

( * ) Notice: Subject to any disclaimer, the term of this patent is extended or adjusted under 35 U.S.C. 154(b) by 121 days.

(21) Appl. No.: 12/240,129

(22) Filed: Sep. 29, 2008

(65) Prior Publication Data

US 2010/0080243 A1 Apr. 1, 2010

(51) Int. Cl.
*H04L 12/54* (2006.01)
*H04L 12/40* (2006.01)

(52) U.S. Cl. .................. 370/423; 370/439; 370/464
(58) Field of Classification Search ............ None
See application file for complete search history.

(56) References Cited

U.S. PATENT DOCUMENTS

| | | | | |
|---|---|---|---|---|
| 4,002,847 A | * | 1/1977 | Dail | 370/224 |
| 5,594,733 A | * | 1/1997 | Katoen et al. | 370/449 |
| 5,812,796 A | * | 9/1998 | Broedner et al. | 710/302 |
| 6,182,163 B1 | * | 1/2001 | Yamashita et al. | 710/12 |
| 6,853,292 B1 | * | 2/2005 | Kramer et al. | 340/3.43 |
| 7,457,285 B1 | * | 11/2008 | Parrish et al. | 370/369 |
| 2003/0226065 A1 | * | 12/2003 | Shingaki | 714/43 |
| 2005/0275386 A1 | * | 12/2005 | Jepsen et al. | 322/9 |
| 2009/0213913 A1 | * | 8/2009 | Farmer et al. | 375/219 |

* cited by examiner

*Primary Examiner*—Chi H Pham
*Assistant Examiner*—Soon-Dong D Hyun
(74) *Attorney, Agent, or Firm*—Slater & Matsil, L.L.P.

(57) ABSTRACT

Embodiments of the invention relate to a bus structure for a serial bus for communicatively coupling a plurality of nodes. Each node is coupled to the transmit channel via a logic gate. The transmit channel is looped back as a receive channel to the receive terminals of all coupled nodes.

19 Claims, 5 Drawing Sheets

SERIAL BUS STRUCTURE

TECHNICAL FIELD

The invention generally relates to digital systems, and more specifically, to a bus structure for a serial bus using two channels for communicatively coupling a plurality of active nodes.

BACKGROUND

In digital processing systems, devices communicate by exchanging data. For that purpose the communicating devices are communicatively connected, i.e., there is a connection between the at least one sender and a receiver. The connection, also known as a communication channel, for example, requires a pathway for transmitting/receiving the data and a data transmission protocol defining the data exchange more specifically.

In conventional data transmission systems a plurality of hardware architectures and a corresponding plurality of data transmission protocols is known, wherein specific hardware architectures can be related to specific transmission protocols and vice versa. For example, protocols may specify to transmit data serially or in parallel. Parallel data transmission protocols specify that, for example, one byte of data is signaled at the same time using eight parallel wires, thus requiring at least eight parallel lines in one transmission channel. In contrast to that data transmission protocols may specify to transmit data serially.

In serial data transmission protocols the bits of the data to be transmitted are signaled one after another using one line or wire, wherein the protocol may specify that the data be packaged into data frames. A data frame may comprise the data to be transmitted and specific protocol data, for example, an address specifying the addressee of the data, a frame identifier and data for ensuring data integrity. For transmitting data between computer devices numerous conventional serial data transmission protocols are known, for example, the Universal Serial Bus (USB) or IEEE 1394 (Firewire).

Besides the well known use in personal computers, serial bus systems have been successfully introduced into various industrial machines for controlling devices therein. Numerous serial data transmission protocols have been developed specifically for controlling devices in machines, for example, known as Controller Area Network (CAN) or the Local Interconnect Network (LIN) or the Inter-Integrated Circuit (I²C). These protocols have been developed to be used, for example, in the automotive industry or automation branch or in so-called embedded systems, for example, for controlling various actuators or systems. While the protocols differ in various specification details they have in common that the bus nodes share at least one line for transmitting/sending and for receiving data, wherein the shared line for transmitting or receiving data may be implemented using a differential signal, for example, as known from the CAN bus physical protocol, or may be implemented using a single line with ground as a reference potential, i.e., as known, for example, from the LIN bus.

Typically the logic for implementing a communication protocol is provided by a microcontroller, wherein the microcontroller provides terminals providing the data to be sent via the bus system and further another interface coupled to a device to control. The microcontroller may further provide other functionality for controlling the coupled device according to data received via the bus or for transmitting data generated by the device. The microcontroller accordingly serves as an interface of the device to the bus system of a specific communication protocol.

The data signals as provided by the microcontroller for sending data via the bus system usually cannot be directly coupled to the physical bus wires, as the logic data provided by the bus do not comply with all requirements of the bus system. For example, when considering the signal integrity the output stage must provide signals of a given voltage level. Accordingly, as conventional microcontrollers are not designed to provide signal levels having a signal integrity compliant with long wires, in conventional bus systems a microcontroller is coupled to the physical bus wires via a transceiver. The transceiver, being a combined transmitter and receiver in a single housing and sharing common circuitry, provides the functionality for applying the signals from the transmit (TxD) terminal of the microcontroller to the bus wire and also for coupling data signaled on the bus wire to the receive (RxD) terminal of the microcontroller. By connecting the TxD and RxD terminals of each bus node via a transceiver to the shared line the line forms a wired-AND.

In structures where bus nodes are located in different voltage domains, in which different reference potentials, i.e., different ground levels, are used, the bus nodes use different voltages as reference potentials. As the bus nodes relate a signal of the RxD or TxD terminal to their individual reference potential, bus signals may have voltages not compliant with the specific node. Accordingly bus systems covering more than one voltage domain additionally require the galvanic separation of the different voltage domains. A decoupler may provide such a galvanic separation, which may be, for example, an optocoupler/opto-isolator or a transformer.

In a bus system comprising a plurality of bus nodes in different voltage supply domains, nodes located in supply domains having a different reference voltage than the bus system are galvanically decoupled from the bus system. Accordingly in conventional systems the RxD and TxD terminals of a microprocessor are each coupled to a decoupling device, the decoupling device is coupled to a transceiver, which in turn is coupled to the bus wires. As the decoupling devices are located between the microprocessors and the transceivers, the microprocessors are galvanically decoupled from the transceivers. All transceivers accordingly can be placed in a single voltage domain, i.e., they may be supplied in a single voltage domain, and each microprocessor can be supplied by any arbitrary different voltage domain.

In conventional bus systems each connection of a node to the bus, e.g., a microprocessor implementing the bus logic functions requires at least a transceiver and, if the node is located in a voltage domain differing from the bus voltage domain, additional decoupling devices for galvanically separating the different voltage domains. Hence there is a need for an improved bus structure.

BRIEF DESCRIPTION OF THE DRAWINGS

The accompanying drawings are included to provide a further understanding of the present invention and are incorporated in and constitute a part of this specification. The drawings illustrate embodiments of the present invention and together with the description serve to explain the principles of the invention. Other embodiments of the present invention and many of the intended advantages of the present invention will be readily appreciated, as they become better understood by reference to the following detailed description.

DETAILED DESCRIPTION OF ILLUSTRATIVE EMBODIMENTS

In the following detailed description, reference is made to the accompanying drawings, which form a part hereof, and in which is shown by way of illustration specific embodiments in which the invention may be practiced. It is to be understood that other embodiments may be utilized and structural or other changes may be made without departing from the scope of the present invention. The following detailed description, therefore, is not to be taken in a limiting sense, and the scope of the present invention is defined by the appended claims.

Figure 1:
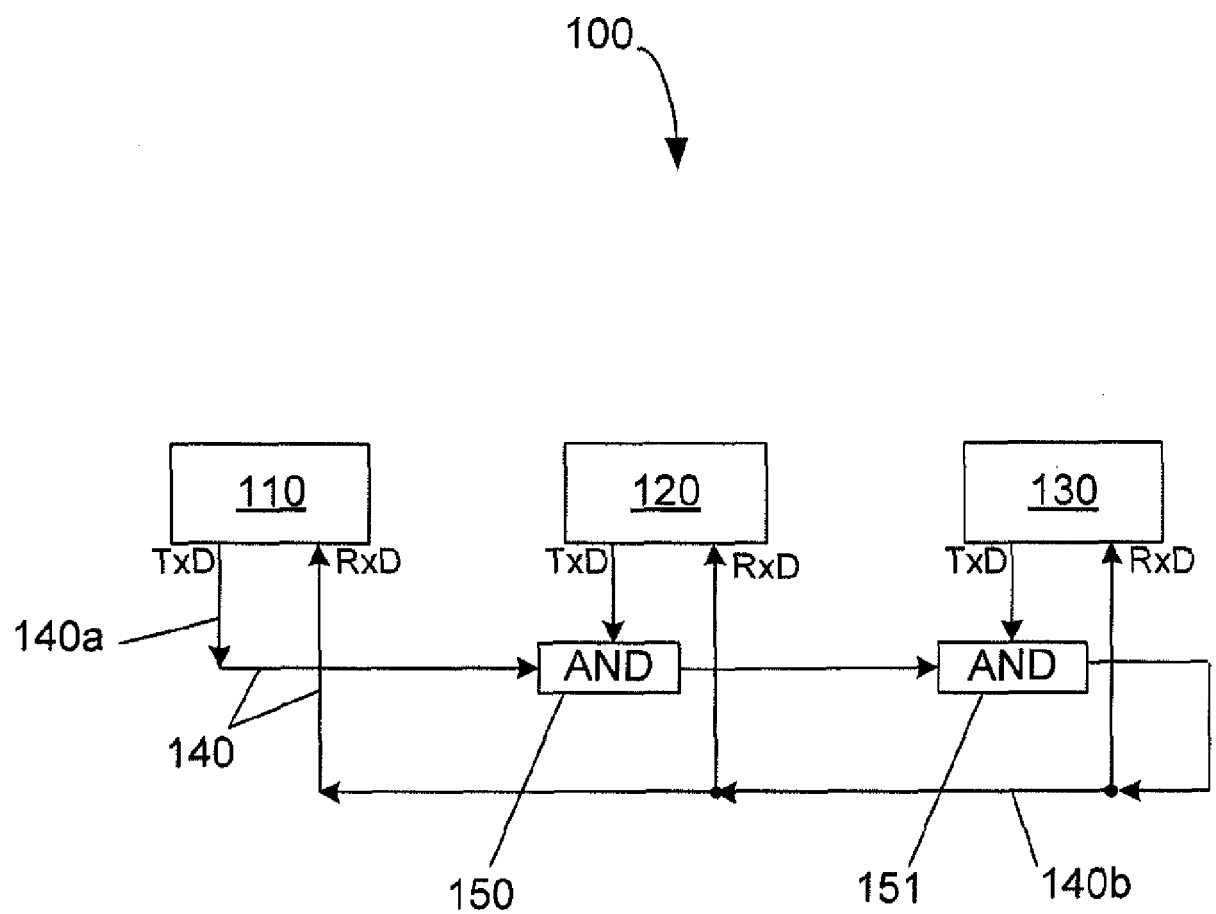
FIG. 1 depicts a schematic structure of a bus system in a single voltage domain.

FIG. 1 shows a schematic representation of a first embodiment of a serial bus structure 100 comprising three bus nodes 110, 120 and 130. Each of the nodes is coupled with its bus terminals, i.e., with its transmit terminal TxD and with its receive terminal RxD correspondingly, to the bus wires of bus 140.

In the depicted embodiment node 110 can be considered to be the first node coupled to bus 140, as there is no other node to couple to the receive channel 140b. Transmit terminal TxD of node 110 is coupled to the first of the two bus channels, which in the description hereinafter is called the transmit channel 140a. Second node 120 is coupled to the transmit channel 140a via a conjunction gate 150, which performs a logic AND operation on the present signal of the transmit channel and the transmit signal as output on the TxD terminal of node 120. The output of conjunction gate 150 is then forwarded on transmit channel 140a. Similarly the output of the TxD terminal of node 130 is coupled to the bus, i.e., to transmit channel 140a, via another conjunction gate 151. Node 130 can be considered as the last node to be coupled to the bus as there is no further node in the chain whose TxD terminal must be coupled to transmit channel 140a, such that transmit channel 140a can be looped back as receive channel 140b. In this way a plurality of bus nodes can be coupled to the bus, wherein each transmit terminal TxD of a node, except the first node, is coupled via a conjunction gate to the transmit channel 140a of bus 140. Channel 140a in this way forms a wired AND of the TxD terminals of all bus nodes coupled to bus 140. The chain of bus nodes can be extended to include further bus nodes by adding bus nodes like node 120 between nodes 110 and 130.

After the TxD output of the last node has been coupled to transmit channel 140a, the channel is looped back to the receive terminals, i.e., RxD terminals, of all bus nodes, thus this line forms a receive channel 140b. Channel 140b in this way reflects the actual signal status of channel 140a and provides the signal to the receive terminal, i.e., RxD terminal, of each node coupled to bus 140.

Optionally the signal as output from the last conjunction gate 151 may be inverted, for example, by an inverter device, not shown in the drawing, before being coupled to the RxD terminals of the nodes, such that the signals on transmit channel 140a and on receive channel 140b form complementary signals. Note that the optional inverter gate is arranged after the last conjunction gate 151, such that it outputs the inverted wired-AND signal as common receive signal. The complementary RxD signal can be locally inverted back to its original level inside the communication controllers. Like this, short circuits between RxD and TxD lines outside the communication controller can be detected.

In one example bus system 100 may be used to couple nodes employing the CAN bus protocol, which implements an asynchronous serial bus transmission protocol using two wires, wherein the signal on the wires is a differential signal. For example, bus node 110 may be a microcontroller implementing the protocol, and which at its TxD and RxD terminals provides signals having, for example, TTL level. Similar to other conventional bus systems the CAN protocol employs a carrier sense multiple access and collision detection (CSMA/CD) method for bus arbitration. The conjunction of the TxD signals of all coupled bus nodes supports the necessary functionality in that a dominant signal level, i.e., here a logic 0, overrules a recessive signal, i.e., a logic 1 correspondingly. Note that the CAN bus protocol specifies the dominant signal, i.e., logic 0, as a low level and a recessive level as a high level, such that in a conjunction, i.e., a logic AND combination, the low level as dominant level overrules a recessive high level. Further field bus systems implementing similar protocol properties are LIN and I²C.

Note that the bus structure of FIG. 1 can be also used for bus protocols, in which a dominant level is defined as a logic 1 and a logic 0 signal accordingly defines the recessive signal, if the logic operation performed by the devices 150, 151 is an OR operation. The signal at the end of transmit line 140a, i.e., after the TxD signal of all nodes have been "ORed", accordingly forms a wired OR. Also an optional inverter may be comprised in these structures to provide the inverted transmit channel as common receive channel.

Conventional microprocessors, which, for example, may be implemented in CMOS technology, may not provide signals suitable for being directly coupled to the wires of a bus system. Similarly conventional logic devices implementing a conjunction or a logic OR may not provide suitable signals. In these cases, i.e., if the signal strength of the output terminals does not allow to couple the signal directly to long bus wires, for example, as required in a vehicle or a machine, the aforementioned bus structure can be implemented using short bus wires. That is the bus nodes, for example, may be mounted on the same printed circuit board or may be integrated into one integrated circuit, for example, such as in an application specific integrated circuit (ASIC). However, these insufficiencies may at least be remedied by using logic gates, i.e., devices performing logic AND or OR or an inverter, which, for example, comprise circuitry for outputting a suitable output signal, i.e., a signal having a suitable signal integrity to be coupled to a wire. In one embodiment the logic gates, for example, may comprise an amplifier for amplifying an output signal or special circuitry for further shaping the output signal to meet particular signal requirements as required by the employed transmission protocol.

The structure can be implemented using either conventional wires for conducting a voltage or a current signal or fiber optics, if the signal is a light signal, wherein electrical signals can be easily converted to light signals using conventional voltage-to-light converter elements.

Structure 100 as depicted in FIG. 1 in this way discloses a structure for a serial bus comprising a transmit channel and a receive channel for communicatively coupling a plurality of active nodes, wherein each node is coupled to the transmit channel via a logic gate, the gate being local to each node, and wherein the transmit channel is looped back as a common receive channel to receive terminals of all coupled nodes. The receive terminals of all coupled nodes accordingly are coupled galvanically to the receive channel. The logic gate for coupling a transmit terminal, i.e., TxD, to the transmit channel may be either an AND gate or an OR gate. Optionally an inverter gate may be coupled to the transmit channel for providing the inverted transmit channel as a receive channel.

In another embodiment nodes coupled to the bus may be supplied by different supply sources, wherein the sources may be related to different reference potentials. Considering the transmit channel each coupled node, i.e., its TxD terminal, necessarily must provide a signal level that complies with the signal range of the channel. Similarly the signal level of the receive channel must be compliant with the allowed signal range of the node, i.e., with the allowed signal range of its RxD terminal. Consequently in a bus structure crossing different voltage domains, i.e., wherein the voltages of a node relate to a different reference potential, the signal levels have to be adapted/transformed to the individual reference potential. For example, in automotive applications the reference potential, i.e., the 0V reference, usually is the chassis of the vehicle. However as bus nodes may operate in circuits coupled to different voltage levels differing from the chassis level, such that they do not share a common reference potential, a communication mismatch may occur.

Figure 2:
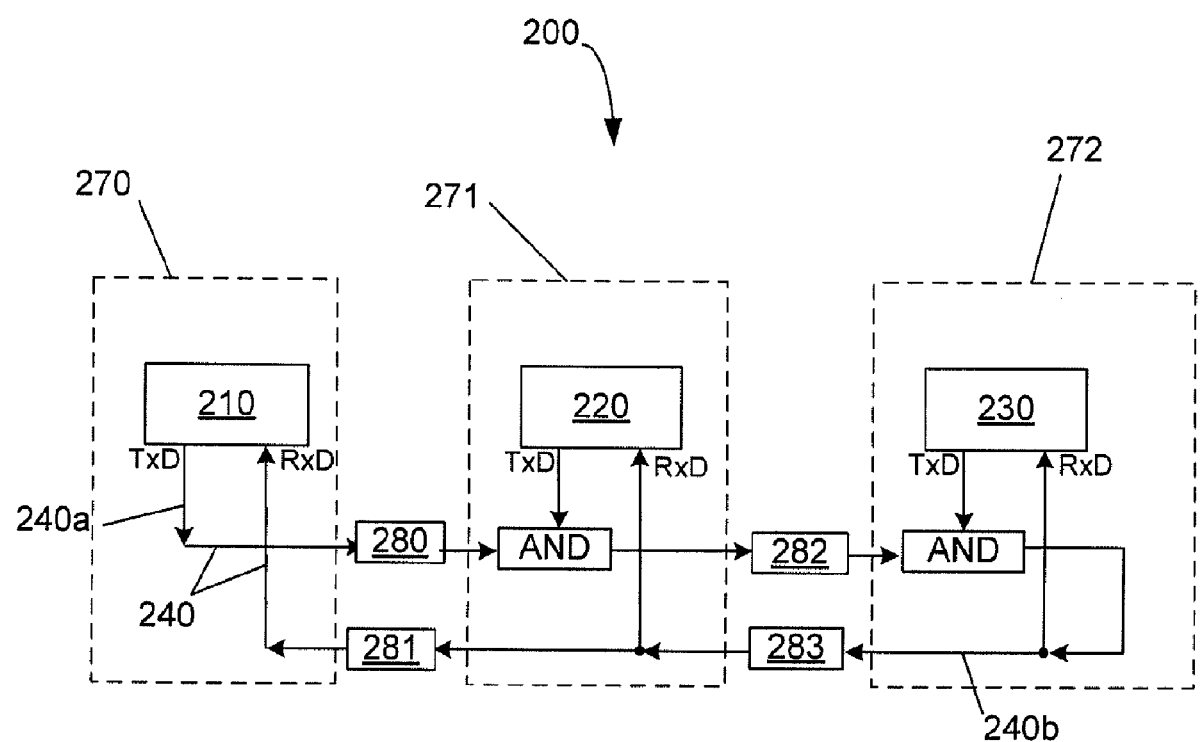
FIG. 2 depicts a schematic structure of a bus system comprising a plurality of nodes in different voltage domains, wherein the receive channel of the bus is configured in a first configuration.

FIG. 2 depicts a bus structure 200 comprising bus nodes 210, 220 and 230, wherein node 210 is arranged and supplied in a first voltage domain 270, node 220 is arranged and supplied in another voltage domain 271 and node 230 is arranged and supplied in another voltage domain 272. The reference potentials of voltage domains 270, 271 and 272 in this embodiment may differ, for example, in that the reference voltage of voltage domain 271 is higher than that of domain 270, and the reference potential of domain 272 is higher than that of domain 271.

In order to adapt the signal level on the bus wires in each voltage domain, devices 280, 281, 282 and 283 are integrated into transmit channel 240a and receive channel 240b respectively. Device 280 up-transforms the signal of transmit channel 240a in voltage domain 270 to the signal level of voltage domain 271 and galvanically decouples the bus wires in voltage domain 270 from the bus wires in voltage domain 271. Similarly decoupling device 282 up-transforms the signal level in voltage domain 271 to the signal level in voltage domain 272, i.e., the signal level related to the reference potential of voltage domain 272. Vice versa, i.e., from a higher voltage domain to a domain of lower voltage, devices 281 and 283 down-transform the bus signal of receive channel 240b, such that the signal levels of the receive channel 240b can be directly galvanically coupled to the RxD terminals of bus nodes 210 and 220. In this way devices 280-283 up- and down-transform the signal levels of transmit channels 240a and 240b respectively between two adjacent voltage domains such that all bus nodes in one voltage domain can be coupled to the bus, wherein a pair of devices, one device for up- and one device for down-transforming the bus signal, is used to transform the bus signals between two adjacent voltage domains.

Devices 280-283 in one embodiment may be implemented based on optocouplers, also known as photocouplers or opto-isolators, which at their input take the bus signal having a signal level of a first voltage domain and which output a corresponding signal, but wherein the signal level is related to another reference potential thus transforming the input signal, i.e., the bus signal, from one voltage domain to another. Alternatively, devices 280-283 may be implemented based on coreless transformers. Alternatively, any device suitable for shifting the voltage level of the bus signals between a first and a second voltage domain may be used.

In cases where the bus signals must be routed through a voltage domain, wherein there is no bus node in the domain to couple to the bus, the bus signals may be routed through the voltage domain without any signal conversion.

The depicted chain of bus nodes can be extended to include further bus nodes located in other voltage domains by transforming the bus signals to that voltage domain and then to couple the new node to the transformed bus signals. The voltage domains of the new node to be coupled to the bus system may be of higher or lower voltage. The signal of transmit channel 240a must be up- or down-transformed and the signal of receive channel 240b must be down- or up-transformed accordingly. In this way a bus node arranged in a voltage domain related to an arbitrary reference potential can be coupled to the bus system 200.

The structure as depicted in FIG. 2 in this way discloses a serial bus structure comprising at least one transformer device for transforming a bus signal related to a first reference potential into a bus signal related to a second, different reference potential. In particular, the structure comprises at least one pair of transformer devices for transforming a transmit channel signal related to the first reference potential into a transmit channel signal related to the second reference potential and for transforming a receive channel signal related to the second reference potential into a receive channel signal related to the first reference potential.

Although in principle it is possible to up-transform and down-transform a bus signal between two arbitrary voltage domains, i.e., transforming a signal from a first reference potential to a different reference potential while maintaining the absolute signal level, the down-transformation is more complex in circuitry when using level shifters based on MOSFETs.

Figure 3:
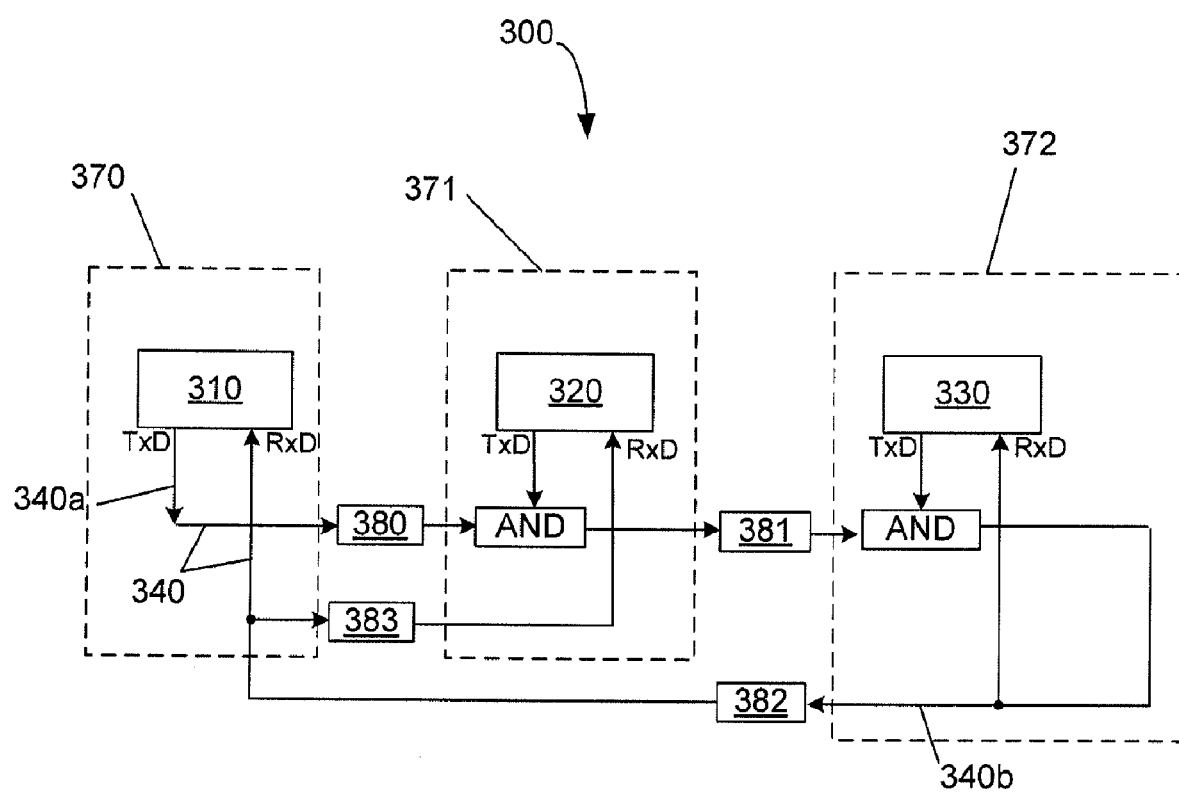
FIG. 3 depicts another bus structure of a bus system comprising a plurality of nodes in different voltage domains with the receive channel configured in a second configuration.

FIG. 3 depicts a bus structure 300 comprising bus nodes 310, 320 and 330 forming a chain of nodes. Similar to the structures described above node 310 can be considered to be the first node, node 330 can be considered to be the last node, i.e., the end of the chain and node 320 exemplifies at least one node coupled between the start and end node of the chain. Each of the nodes 310-330 is located in and supplied by a voltage domain, i.e., voltage domains 370-372, having a voltage differing from that of the adjacent domain, wherein voltage domain 370 is related to a lower reference potential than domain 371, which in turn is related to a lower reference potential than domain 372.

The signals of bus 340 accordingly must be transformed into signals related to each respective reference potential. Considering now that the effort for transforming a signal related to a first reference potential into a bus signal related to a higher reference signal is smaller than the effort for transforming a bus signal to a lower reference potential, the bus nodes are coupled to transmit signal 340a with ascending reference potential. Consequently the node related to the lowest reference potential forms the starting node, i.e., the TxD signal of the starting node is not coupled via a logic gate to an existing transmit signal. In the structure as illustrated here this is bus node 310. TxD signal of node 310 is then up-transformed by device 380 to the reference potential of voltage domain 371. When TxD signal of node 320 is logically combined with the up-transformed transmit signal of channel 340a, the signal is up-transformed again to form a bus signal 340a related to the next higher reference potential, which in this case is the reference potential of the last bus node 330. The TxD signal of node 330 is then combined with the up-transformed transmit signal, such that transmit signal 340a at this stage reflects the wired-and of all TxD signals. Optionally the signal then may be inverted by an inverter gate.

After the TxD signal of the last node in the chain of bus nodes has been combined with the transmit signal, the signal, which from here on forms the signal of receive channel 340b, is down-transformed to the lowest of the reference potentials of the voltage domains by down-transformer device 382. According to the reference potential the signal refers to, the down-transformed signal of receive channel 340b is coupled to the bus node related to that reference potential.

For coupling other bus nodes, i.e., node 320, relating to higher reference potentials to receive channel 340b the signal is up-transformed to the voltage domain relating to the next higher reference potential, i.e., by up-transformer 383. That is node 320 is coupled to the receive channel of bus 340 after that the signal is down-transformed to the lowest reference potential and then up-transformed to the specific reference potential. Further on, in order to couple additional nodes in the chain and relating to a reference potential between the lowest and the highest reference potential, the signal of receive channel 340b is up-transformed to the next higher reference potential and the signal is coupled to the RxD terminal of the specific node. In this way the signal of receive channel 340b is down-transformed only one time, thus requiring only one down-transformer device 382 and a plurality of transformer devices for transforming a signal to relate to a higher reference potential.

Structure 300 accordingly describes a bus structure comprising one transformer device for transforming the receive channel signal related to the highest reference potential into a corresponding signal related to the lowest reference potential.

Due to the structure the signal of receive channel 340b is down-transformed once and then stepwise up-transformed to higher reference potentials. That is the receive channel signal is up-transformed by a plurality of up-transformers, each delaying the signal, such that a bus node in a voltage domain relating to the highest but one reference potential has the longest delay.

Figure 4:
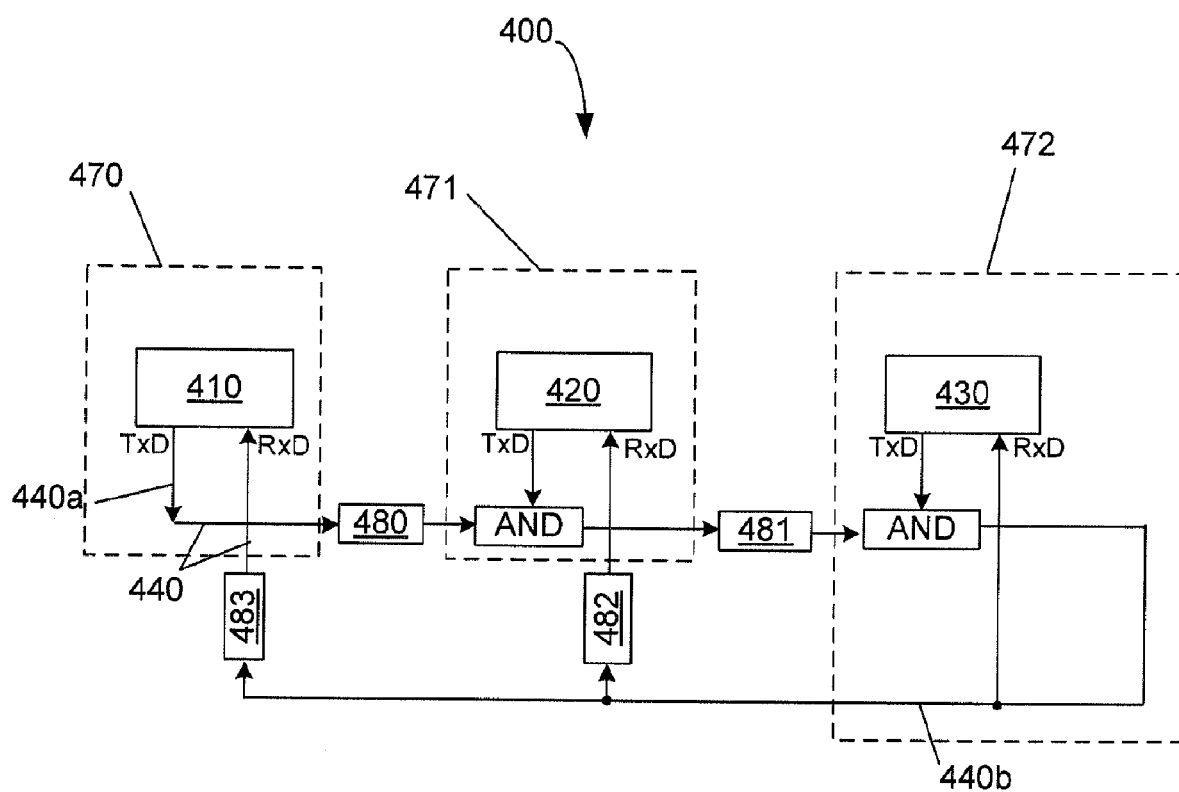
FIG. 4 depicts a further bus structure of a bus system comprising a plurality of nodes in different voltage domains, the receive channel configured in a third configuration.

FIG. 4 illustrates another embodiment comprising a chain of bus nodes 410, 420 and 430 coupled to bus 440, wherein the nodes are arranged in different voltage domains 470-472, such that the bus signals at the terminals of the nodes are related to different reference potentials. Therefore the signal of transmit channel 440a is up-transformed from voltage domain 410 to voltage domain 420, similar as described above, such that the TxD signal of each node may be coupled via a simple conjunction gate to the bus. Similar as described above the signal of receive channel 440b can be inverted optionally by an inverter gate. Then the signal of receive channel 440b can be directly coupled to the RxD terminal of node 430, as the signal at this stage is still related to the reference potential of voltage domain 472.

To couple the receive channel signal to nodes 410 and 420 at the same time the signal is transformed to each specific voltage domain by parallel transformers 482 and 483 respectively. In this way the signal of receive channel 440b is transformed individually for each voltage domain relating to a reference voltage different from that to which the last node in the chain, i.e. node 430 here, is related. Accordingly in the above described embodiment, i.e. where voltage domains 470 and 471 relate to a lower reference potential, transformers 482 and 483 down-transform the receive channel signal. Alternatively, in cases where voltage domains 470 or 471 are related to a higher reference potential than voltage domain 472, the transformers may be up-transform receive channel signal 440b. That is bus structure 400 may comprise a plurality of parallel switched transformer devices each coupled to the receive channel signal 440b as output by the last node for transforming the signal for each specific node individually, wherein a transformer may transform the signal of receive channel 440b either to a higher reference potential or a lower reference potential.

In this way structure 400 comprises a plurality of transformer devices coupled in parallel to the receive channel for individually transforming the receive channel signal into a plurality of receive channel signals related to different reference potentials.

Figure 5:
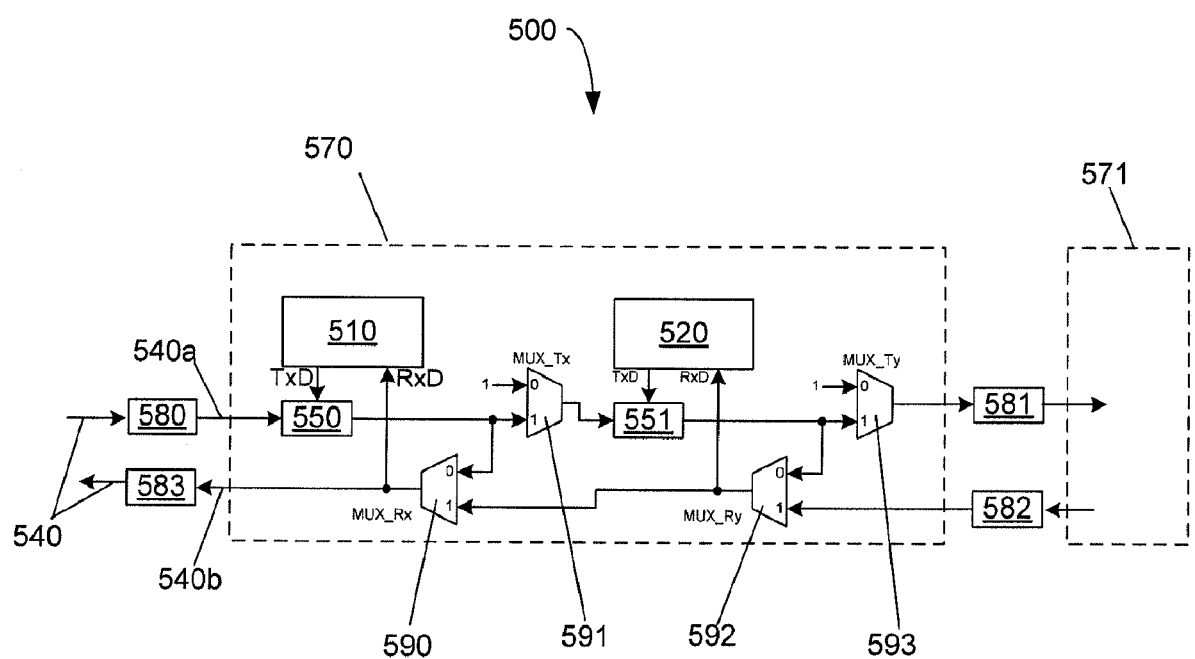
FIG. 5 depicts another bus structure of a bus system comprising a plurality of nodes in different voltage domains, wherein the structure is configured and adapted to couple nodes to the bus individually.

FIG. 5 depicts a further embodiment of a bus structure comprising a plurality of nodes 510, 520 coupled to a serial bus 540 comprising a transmit channel 540a and a corresponding receive channel 540b. The nodes are coupled to transmit channel 540a via logic gates 550, 551, which, for example, may be a conjunction. Receive channel 540b is a loop back of the transmit channel and is coupled directly to the receive terminals of the nodes.

In this embodiment nodes 510 and 520 share a common voltage domain 570, i.e., both nodes relate to the same reference potential. Accordingly there is no need for any transformer to transform the bus signals between bus nodes 510 and 520. Voltage domain 570 is coupled via transformers 580-583 to adjacent voltage domains, which may comprise further nodes coupled to bus 540. For example, voltage domain 571 may comprise another node, not shown in the drawing, and may be coupled to still another voltage domain comprising another node, or voltage domain 571 may comprise the last node in the chain of bus nodes, such that transmit channel 540a optionally may be inverted and looped back as receive channel 540b. Similarly voltage domain 570 may be coupled to an arbitrary number of upstream voltage domains, i.e., voltage domains coupled via transformers 580 and 583 to the voltage domain 570.

In this arrangement bus nodes can be coupled individually to bus 540 by controlling switches 590-593, wherein a node may be coupled to the bus if all upstream nodes are coupled to the bus. That is node 520 may be coupled if node 510 has been coupled to the bus and nodes in voltage domain 571 may be coupled to the bus if all upstream nodes, i.e., nodes to the left, are coupled to the bus. In this way there is a predefined order for coupling the nodes sequentially and downwardly to the bus.

Initially all multiplexers, i.e., 590-593, are controlled to be in position 0, such that all downstream nodes, i.e., node 520, receive a recessive signal permanently. Receive channel 540b in this situation reflects the looped back transmit channel of node 510 and all upstream nodes. Accordingly node 510 is the last node coupled to the chain of nodes.

For coupling node 520 to bus 540 switches 590 and 591 are controlled to toggle their state to state 1, thus forwarding the signal of transmit channel 540a to logic gate 551, which couples the transmit terminal TxD of node 520 to transmit channel 540a, and coupling the receive terminal of node 520 to receive channel 540b, thus enabling node 520 to receive the signals of bus 540. Switch 592 is kept in position 0 such that it loops back to the output of gate 551 as receive channel 540b, and switch 593 is kept in position 0 thus blocking transmit channel 540a for downstream bus nodes. As soon as node 520 is communicatively coupled to bus 540 the node may participate in the bus communication. For example, one of the first messages sent to a node coupled to the bus lastly may communicate an identifier for the node, which the node will use in later communications as an unique address. After having received the identifier and optionally further initial information, the node may act as any other node on the bus. In this way in bus systems where node identifiers may be assigned dynamically, each node may at first receive its identifier after having been coupled to the bus, then the next node, i.e., here nodes in voltage domain 571, may be coupled to the bus for receiving their respective identifier. In this way a plurality of nodes may be connected dynamically to the bus system, wherein nodes are coupled one after another to the bus.

Note that in variations of the embodiment all bus nodes may be arranged in a single voltage domain, such that the principle of integrating multiplexers into the bus channels may be applied with using transformers. Also the function of inverting the signal of transmit channel 540a may be integrated into the depicted embodiment in order to provide the signal of receive channel 540b as an inverted transmit channel.

Circuit 500 in this way comprises at least one switching device in transmit channel 540a and one switching device in receive channel 540b for coupling a node to the bus.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A bus structure for a serial bus comprising:
    a transmit channel and a receive channel for communicatively coupling a plurality of nodes, wherein each node is coupled to the transmit channel via a logic gate, and wherein the transmit channel is looped back as the receive channel to receive terminals of all coupled nodes; and
    at least one transformer device for transforming a bus signal related to a first reference potential into a bus signal related to a second. different reference potential.

2. The bus structure of claim 1, wherein nodes are coupled via individual, local logic gates to the transmit channel, the logic gates thus forming a chain of logic gates.

3. The bus structure of claim 1, wherein the receive terminal of each node is galvanically coupled to the receive channel.

4. The bus structure of claim 1, wherein the logic gate provides an AND coupling.

5. The bus. structure of claim 1, wherein the logic gate provides an OR coupling.

6. The bus structure of claim 1, further comprising an inverter gate coupled to the transmit channel for providing an inverted transmit channel as the receive channel.

7. The bus structure of claim 1, comprising at least one pair of transformer devices for transforming a transmit channel signal related to the first reference potential into a transmit channel signal related to the second reference potential and for transforming a receive channel signal related to the second reference potential into a receive channel signal related the first reference potential.

8. The bus structure of claim 7, further comprising one transformer device for transforming the receive channel signal related to a highest reference potential into a corresponding signal related to a lowest reference potential.

9. The bus structure of claim 7, further comprising a plurality of transformer devices coupled in parallel to the receive channel for individually transforming the receive channel signal into a corresponding plurality of signals related to different reference potentials.

10. The bus structure of claim 1, further comprising at least one switching device in the transmit channel and one switching device in the receive channel for coupling a node to the serial bus.

11. A method for operating a serial bus system comprising a transmit channel and a receive channel for communicatively coupling a plurality of nodes, the method comprising:
    coupling a transmit signal of a node to the transmit channel by a local logic operation and looping back the transmit channel as a common receive channel to receive terminals of all coupled nodes; and
    transforming a transmit channel signal related to a first reference potential into a transmit channel signal related to a second, different reference potential and transforming a receive channel signal related to the second reference potential into a receive channel signal related to the first reference potential.

12. The method of claim 11, wherein coupling the transmit signal of a node to the transmit channel is a conjunction.

13. The method of claim 11, wherein coupling the transmit signal of a node to the transmit channel is a logic OR coupling.

14. The method of claim 11, further comprising inverting the transmit channel to provide an inverted transmit channel as the receive channel.

15. The method of claim 11, further comprising transforming a bus signal related to the first reference potential into a bus signal related to the second, different reference potential.

16. The method of claim 11, further comprising transforming the receive channel signal related to a highest reference potential into a corresponding signal related to a lowest reference potential.

17. The method of claim 11, further comprising transforming at the same time the receive channel signal related to the first reference potential to a plurality of corresponding receive channel signals related to reference potentials differing from the first reference potential.

18. The method of claim 11, further comprising controlling a switching device arranged in the transmit channel to pass a transmit channel signal to an additional node and controlling a switching device arranged in the receive channel to couple a receive channel signal to the additional node.

19. A system comprising:
    a logic gate to couple a transmit signal of a transmit terminal of a node to a transmit channel of a serial bus and a feedback loop to loop back the transmit channel as common receive channel to receive terminals of all nodes coupled to the serial bus; and
    at least one transformer device for transforming a bus signal related to a first reference potential into a bus signal related to a second, different reference potential.

* * * * *